United States Patent Office 2,839,120
Patented June 17, 1958

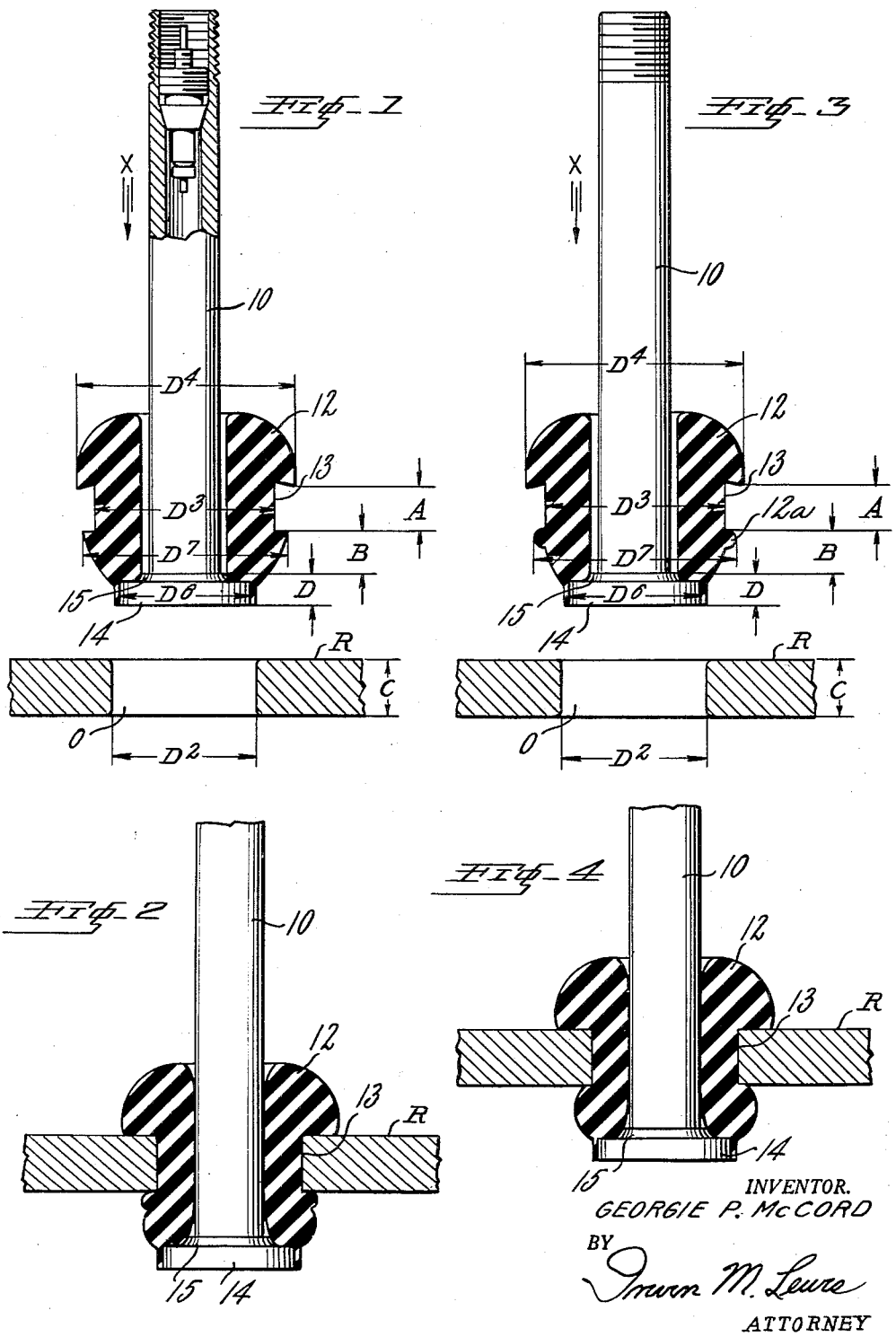

2,839,120

TUBELESS TIRE VALVE

Georgie P. McCord, Oaklandon, Ind., assignor to United States Rubber Company, New York, N. Y., a corporation of New Jersey Application September 15, 1955, Serial No. 534,560

4 Claims. (Cl. 152—427)

This invention relates to a valve for a tubeless tire and rim assembly and in particular to a valve of the type which utilizes the inherent elasticity of an outer resilient rubber cover or grommet to seal and anchor the valve in the usual valve stem opening through the rim of the tubeless tire.

The object of the invention is to provide a valve of this type which may be easily inserted in the valve stem opening of the rim from the exterior side of the rim and which once inserted will effectively resist dislodgement by high pressure within the tire.

To accomplish this object, the valve of the present invention differs in at least one respect, from valves of this general type heretofore proposed, in that only the inner end of the resilient rubber grommet, i. e., the end that is first inserted into the valve stem opening of the rim, is bonded to the rigid, usually metal, tubular insert or stem which carries the check valve. Preferably, the rigid stem is provided with an outwardly extending flange to which the inner end of the grommet is bonded.

It has been found that if, in accordance with the present invention, only the inner end of the grommet is bonded to the rigid stem, that the grommet will more readily elongate, with a consequent reduction in diameter, during insertion of the valve stem in the valve stem opening through the rim thereby facilitating the insertion of the valve. It has also been found that with this construction, the inner end of the grommet will more readily mushroom outwardly when forced or pressure is applied thereto so that expulsion of the valve from the opening by pressure within the tire is effectively resisted.

Other objects and advantages of the present invention will become apparent from the following description when read in conjunction with the accompanying drawings, wherein:

Fig. 1 is a sectional view showing the valve of the invention and a section of rim prior to insertion of the valve into the valve stem opening through the rim, Fig. 2 is a sectional view similar to that of Fig. 1, but showing the valve of Fig. 1 installed in the opening through the rim, Fig. 3 is a sectional view similar to that of Fig. 1, but showing a slightly modified form of valve, and Fig. 4 is a sectional view similar to that of Fig. 2, showing the valve of Fig. 3 installed in the opening through the rim.

Referring to the drawings and in particular to Fig. 1, the valve of the invention includes a rigid tubular stem 10, commonly called an insert. The outer end of the stem 10 is internally threaded to receive a conventional spring type check valve 11, commonly called a valve core, and is externally threaded to receive a conventional dust cap (not shown). The stem 10 is conveniently made of brass, because of the comparative ease with which rubber may be bonded thereto during vulcanization.

A resilient rubber grommet 12 surrounds the inner end of the stem 10. The grommet 12 is provided with a circumferentially extending groove 13 in the outer surface thereof intermediate the ends thereof into which the edge of a rim R surrounding the valve stem opening O therethrough can extend so as to anchor the valve to the rim when the valve is installed therein as shown in Fig. 2.

The grommet 12, prior to insertion into the opening O, has a diameter, D–7, on one side of the groove 13 and a diameter, D–4, on the other side of the groove 13 substantially greater than the diameter, D–2, of the opening O. The diameter, D–3, of the base of the groove is also larger than the diameter of the opening O, so that when the valve is installed in the opening O, the base of the groove 13 is under radial compression so as to form a seal between the grommet and the edge of the rim surrounding the opening O. The width, A, of the groove 13 is preferably the same as the thickness, C, of the rim R but the valve will function properly in rims having a thickness either smaller or larger than the width of the groove 13.

The diameter, D–6, of the inner end of the grommet 12, i. e. the end thereof which is inside the inflated tire, is preferably less than that of the opening O to facilitate the insertion of the valve into the opening O. The diameter of the inner end gradually increases from the diameter D–6 to the larger diameter, D–7, adjacent the groove 13.

In accordance with the invention, only an inner end portion of the grommet 12, spaced from the groove 13, is bonded to the stem 10. Preferably the stem 10 is provided, as illustrated in the drawings, with an outwardly extending flange 14 having a shoulder portion 15 to which the inner end of the grommet 12 is bonded. The flange 14 provides a relatively large bonding area over a rather short axial length of the valve. Thus a very strong bond is obtained over a relatively short axial length, D. The lack of bond between the remaining portion of the grommet 12 and stem 10 is indicated in Figs. 1 and 3 by the space between the grommet and stem.

The modification as shown in Figs. 3 and 4 differs from that of Figs. 1 and 2 in that the grommet is reduced in diameter a short distance from the groove 13 so as to form a rib 12a. By this construction, the mass of rubber which must be forced through the rim opening O is somewhat reduced, thereby facilitating insertion of the valve.

In installing either the valve of Fig. 1 or Fig. 3, the inner end of the valve is placed in the opening O and force applied axially to the stem 10 in the direction of the arrow X. Because only the inner end of the grommet is bonded to the stem 10, the grommet 12 is in effect pulled through the opening by the application of force to the stem 10. The fact that only the inner end portion of the grommet 12 is bonded to the stem permits the grommet to readily elongate over the distance, B, with a consequent reduction in diameter, during insertion and to mushroom outwardly once inserted as shown in Figs. 2 and 4, thereby facilitating insertion of the valve and increasing the effective anchoring of the valve in the opening O once it has been inserted. Any force tending to expel the valve from the opening O merely causes further mushrooming of the grommet over the distance B, so that even greater resistance against expulsion is provided.

From the above description, it can be seen that there is provided a valve which may be easily inserted in the valve opening of a rim for a tubeless tire from the exterior side of the rim and which once inserted will effectively resist forces tending to expel the valve from the opening.

While certain preferred forms of the valve have been shown and described, it is to be understood that this is for the purpose of illustration and that changes and modifications could be made therein without departing from the spirit and scope of the invention.

The term "rubber" is used herein in its generic sense to denote natural rubber, synthetic rubber or blends thereof.

Having thus described my invention, what I claim and desire to protect by Letters Patent is:

1. A valve for use with a rim for a tubeless tire comprising, a rigid hollow stem adapted to receive a check valve therein, a resilient rubber grommet surrounding said stem, said grommet having a circumferentially extending groove formed in the outer surface thereof intermediate its ends, said grommet being bonded to said stem only around the inner end portion of said grommet at a point spaced axially from said circumferentially extending groove, but being otherwise disconnected from said stem.

2. A valve for use with a rim for a tubeless tire comprising, a rigid hollow stem adapted to receive a check valve therein, said stem having a flanged portion at one end, a resilient rubber grommet surrounding said stem and bonded only to said flanged portion of the stem, and being otherwise disconnected from said stem, said grommet having a circumferentially extending groove formed in the outer surface thereof intermediate its ends and spaced axially from said flanged portion of the stem.

3. A valve for use with a rim for a tubeless tire comprising, a rigid hollow stem adapted to receive a check valve therein, a resilient rubber grommet surrounding said stem, said grommet having a circumferentially extending groove formed in the outer surface thereof intermediate its ends, said grommet being of substantially smaller diameter adjacent one end thereof than adjacent said groove, said grommet being bonded to said stem only around an inner end portion of said one end of said grommet, but being otherwise disconnected from said stem.

4. A valve for use with a rim for a tubeless tire comprising, a rigid hollow stem having means for securing a check valve in one end thereof, a resilient rubber grommet surrounding said stem, said grommet having a circumferentially extending groove formed in the outer surface thereof intermediate its ends, said grommet being bonded only to the other end of said stem around an inner end portion of said grommet spaced axially from said circumferentially extending groove, but being otherwise disconnected from said stem.

References Cited in the file of this patent

UNITED STATES PATENTS

| | | |
|---|---|---|
| 2,225,472 | Franklin | Dec. 17, 1940 |
| 2,532,210 | Wasserlein | Nov. 28, 1950 |
| 2,587,470 | Herzegh | Feb. 26, 1952 |